Nov. 14, 1961     C. E. HALE     3,008,755
FOLDING BACKREST FOR THE REAR SEAT OF STATION WAGONS
Filed Aug. 26, 1959     4 Sheets-Sheet 1
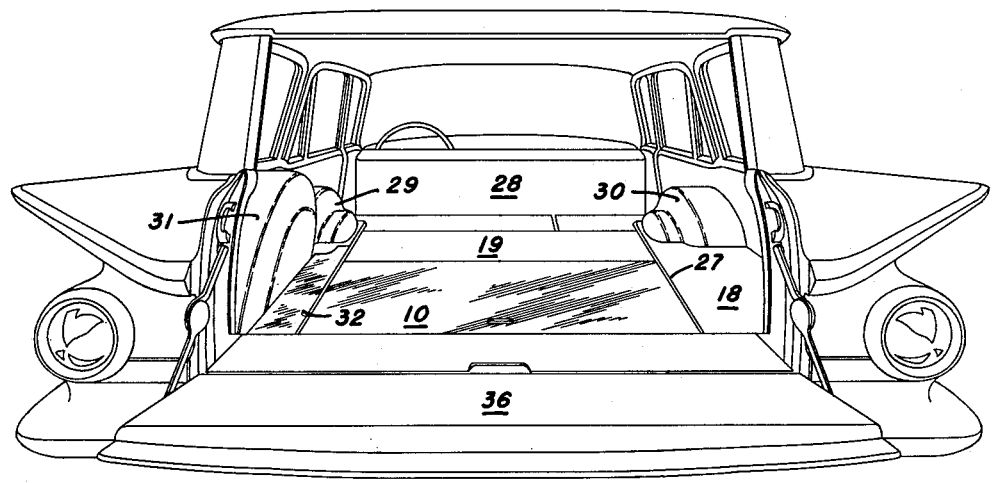
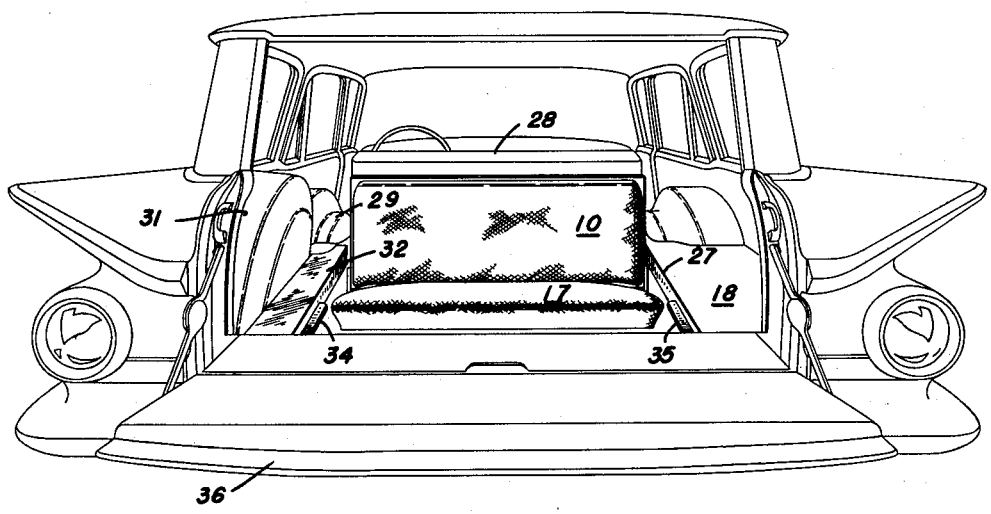
CLIFFORD E. HALE
*INVENTOR.*

Nov. 14, 1961  C. E. HALE  3,008,755
FOLDING BACKREST FOR THE REAR SEAT OF STATION WAGONS
Filed Aug. 26, 1959  4 Sheets-Sheet 2
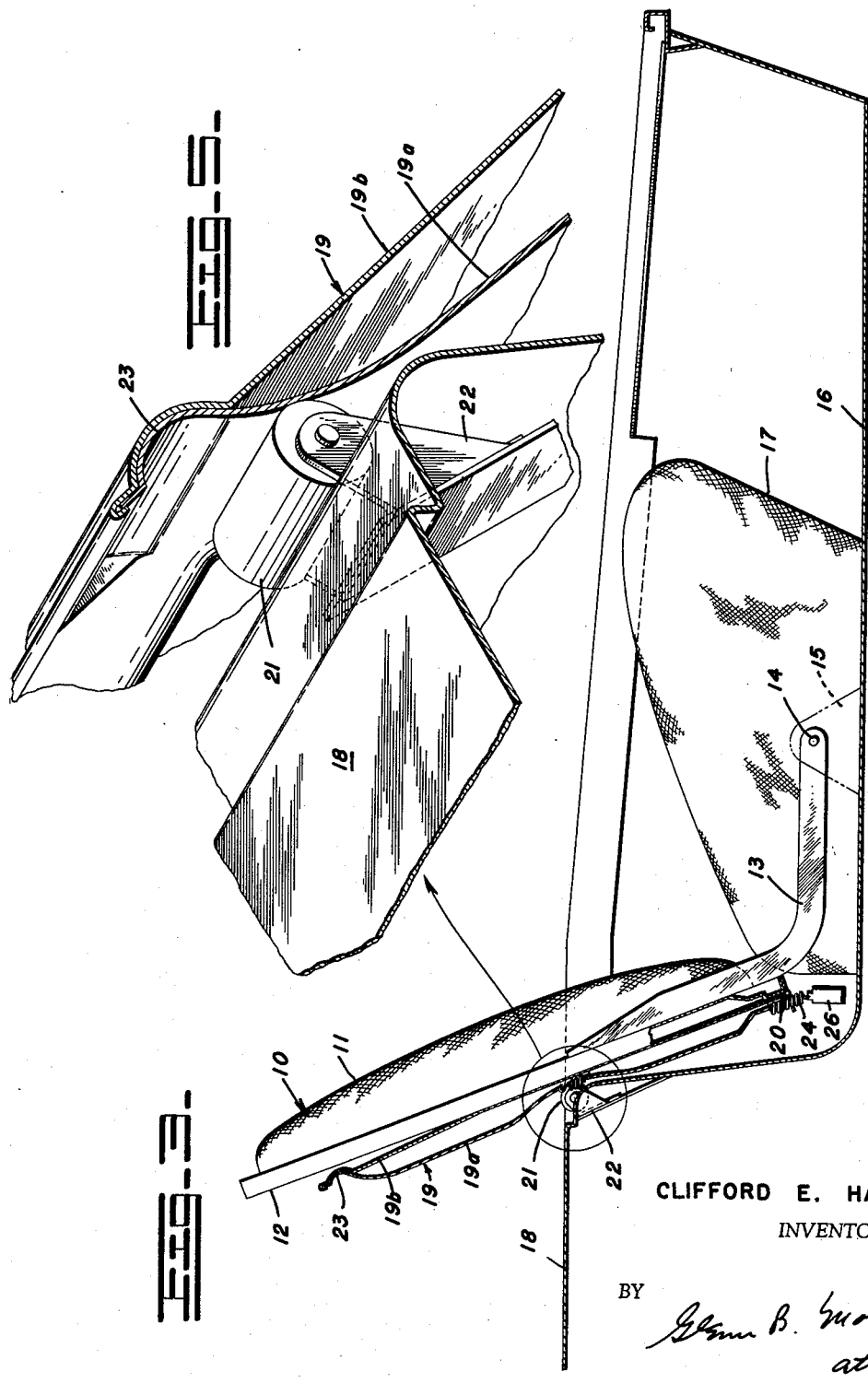
CLIFFORD E. HALE
INVENTOR.
BY

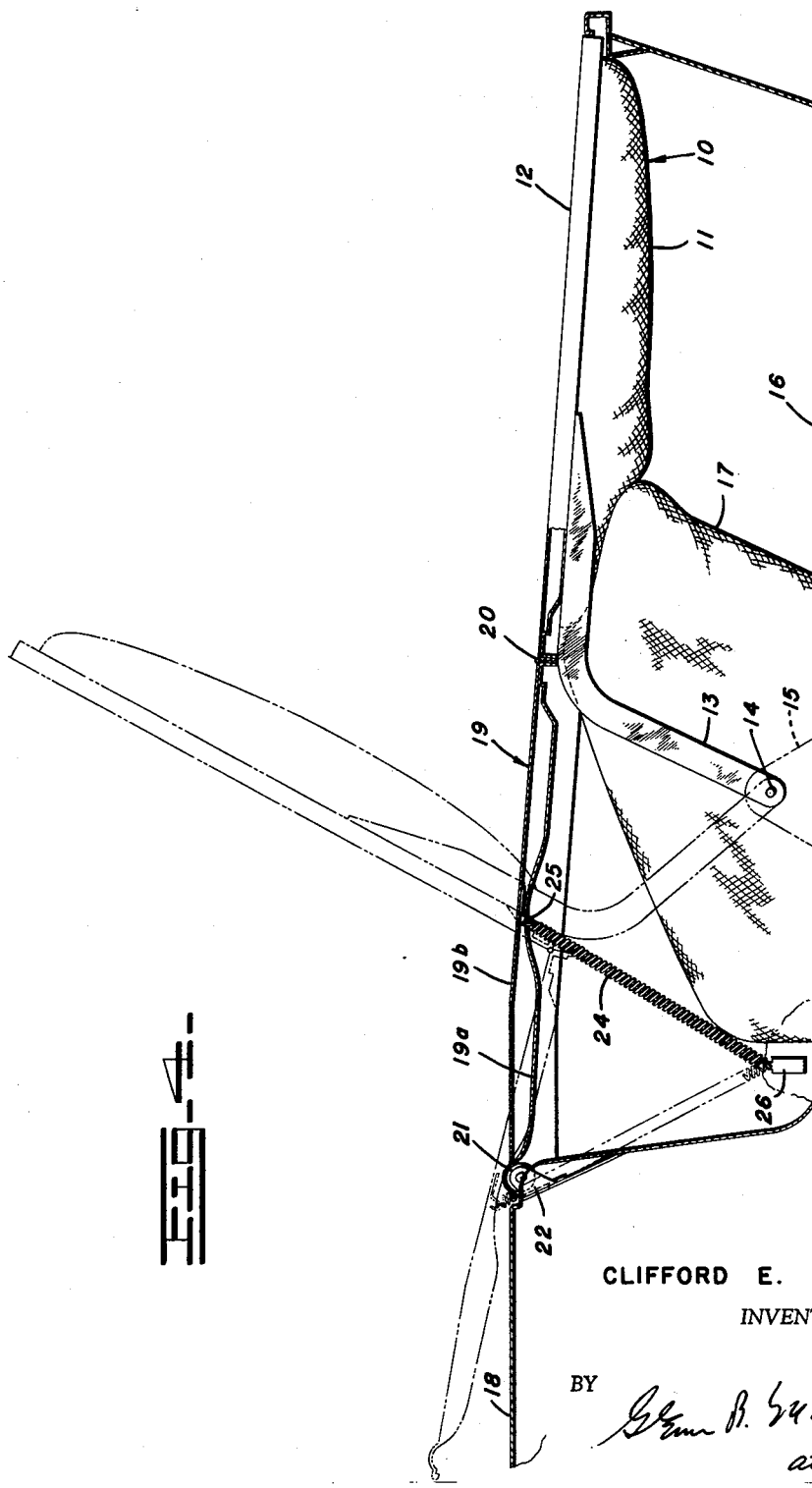

Nov. 14, 1961 C. E. HALE 3,008,755
FOLDING BACKREST FOR THE REAR SEAT OF STATION WAGONS
Filed Aug. 26, 1959 4 Sheets-Sheet 4
FIG-6-
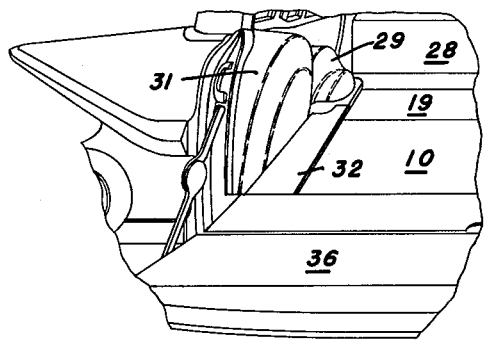
FIG-7-
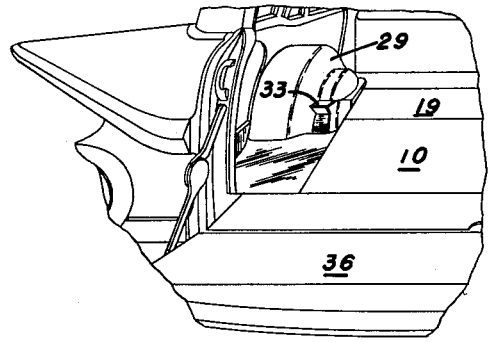
FIG-8-
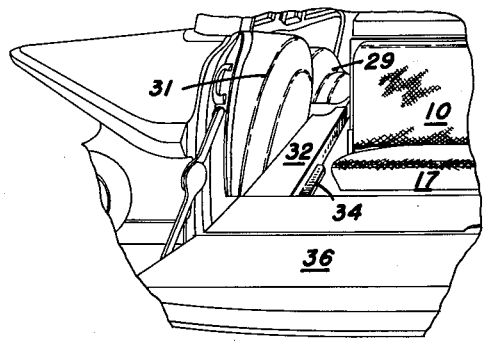
FIG-9-
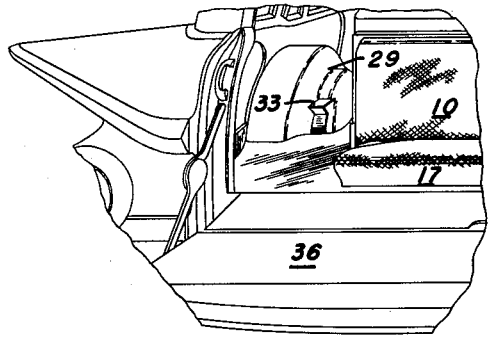
CLIFFORD E. HALE
*INVENTOR.*

United States Patent Office 3,008,755
Patented Nov. 14, 1961

3,008,755
FOLDING BACKREST FOR THE REAR SEAT OF STATION WAGONS
Clifford E. Hale, Lonia, Mich., assignor, by mesne assignments, to General Motors Corporation, Detroit, Mich., a corporation of Delaware
Filed Aug. 26, 1959, Ser. No. 836,112
4 Claims. (Cl. 296—66)

This invention relates to folding backrests for vehicle seats, and has been developed primarily for the rear seat of station wagons. It generates a folding movement from the erect position into a folded attitude in which the backrest forms a continuation of the floor of the vehicle. The backrest moves within an opening in the floor, and only a portion of this opening is covered by the back itself. The remainder of the opening is covered by an auxiliary floor panel which moves with the backrest. The several features of the invention will be analyzed in detail through a discussion of the particular embodiments illustrated in the accompanying drawings. In the drawings:

FIGURE 1 presents a rear view of a station wagon embodying the invention, with the rear seat in the folded position in which the components form a continuation of the vehicle floor.

FIGURE 2 presents a view of the same vehicle, with the rear seat in the erect position.

FIGURE 3 presents a sectional side elevation showing the backrest structure in the erect condition, FIGURE 3 being on an enlarged scale from that of FIGURES 1 and 2.

FIGURE 4 presents a sectional elevation similar to that of FIGURE 3, but illustrating the folded position of the backrest unit in full lines. An intermediate position is illustrated in dotted lines.

FIGURE 5 illustrates an enlarged fragmentary sectional view in perspective showing the preferred auxiliary support for the movable floor panel.

FIGURE 6 illustrates a fragmentary view in perspective in the area adjacent the spare tire in the vehicle, showing the backrest in the folded position, with an auxiliary side beam also in position opposite the spare tire.

FIGURE 7 presents a view similar to that of FIGURE 6, but showing the auxiliary beam and the spare tire removed.

FIGURE 8 illustrates the erect position of the unit, with the spare tire and auxiliary beam in position.

FIGURE 9 illustrates the erect position of the backrest, and with the spare tire and auxiliary beam removed.

Referring particularly to FIGURES 3, 4, and 5 the backrest panel indicated generally at 10 includes an upholstered portion 11 and a structural portion 12. The surface of the structural portion 12, which is on the opposite side of the unit from the upholstering, is of a durable nature, and forms a continuation of the floor of the vehicle when the back panel is in the folded position. A set of arms 13 on the opposite side of the backrest extend to points of pivotal connection as shown at 14 on the brackets indicated at 15, which may be considered as fixed with respect to the frame of the vehicle. A pan 16 is secured to the frame, and forms a recess in which the seat 17 and the backrest are received. The floor level of the station wagon is indicated at 18.

In proceeding from the erect position shown in FIGURE 3 to the folded position, the backrest unit pivots about the connection 14 in a clockwise direction into the position shown in FIGURE 4. A slight amount of interference exists between the upholstry of the backrest and the seat 17, but sufficient flexibility exists in these members to accommodate this interference without injuring the components.

The movable floor panel 19 is formed by the spaced and shaped pieces of sheet steel indicated at 19a and 19b, respectively. The panel 19 is pivotally connected to the backrest by the hinge shown at 20. The movable floor panel 19 articulates with respect to the backrest about this hinge during the movement from the erect position to the folded position. In the erect position, the movable floor panel 19 lies against the backrest as shown in FIGURE 3, and forms a support for the backrest. As the backrest moves in a clockwise direction about its pivot point 14, it carries with it the lower extremity of the movable floor panel as shown in dotted lines in FIGURE 4. As this motion proceeds, the panel changes from parallelism to the back seat to gradually form an increasingly open angle until a relative rotation of approximately 180° has taken place. During this movement, the hinge 20 moves with respect to the floor of the vehicle, and drags the movable floor panel 19 across the supporting abutments provided by the rollers 21 mounted on the opposite sides of the vehicle on the brackets 22 fixed with respect to the frame. In the fully folded position, the floor panel becomes a continuation of the floor surface 18, and the recess 23 fits neatly around the contour of the roller 21, as shown in full lines in FIGURE 4.

A spring 24 is connected at its upper end to the hook 25 on the movable floor panel 19, and the opposite end of this tension spring is connected to the tab 26 on the frame of the vehicle. The point of connection of the lower end of the spring to the tab is on the opposite side of the pivot point 14 from the folded position of the backrest shown in FIGURE 4. Tension in the spring 24 holds the movable floor panel 19 securely down in position when the unit forms the continuation of the floor surface, and also serves to provide balancing forces for facilitating the movement of the seat to the erect position shown in FIGURE 3. The relative position of the various axes of rotation, considered with respect to the points of connection of the spring 24, creates an over-center movement which tends to create a positive and rattle-free positioning of the device at both extremes of movement.

Referring to FIGURES 1, 2, and 7 through 9, the opening 27 in the floor of the vehicle is occupied by the backrest 10 and the movable floor panel 19 when the unit is in the folded position shown in FIGURE 1. In FIGURE 1, a forward seat 28 and conventional fender wells 29 and 30 are illustrated, and also a spare tire 31. In addition to the opening 27, it is preferable that a removable beam 32 be provided opposite the spare tire to facilitate the installation and removal of it. This beam is supported at its forward end on the ledge 33 adjacent the wheel well 29, and is supported at the rear end by any convenient structure fixed with respect to the frame. A shelf 34 provides auxiliary support for the backrest 10 in the folded position. A similar shelf 35 is provided in the opposite side of the vehicle on the fixed structure of the floor. In each of FIGURES 1, 2, and 6 through 9, the tail gate 36 is shown in the "down" position.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a vehicle having a floor with a recessed portion forming a seat well therein, a folding backrest for a rear seat comprising: a back panel pivotally mounted on said floor in said seat well; a movable floor panel pivotally connected to said back panel on an axis of rotation parallel to the axis of the pivotal mounting of said back panel on said floor; abutment means on said floor adjacent said seat well and including roller means for supporting said movable floor panel at points remote from the pivotal connection of said movable floor panel, said pivotal axes being disposed to cause said back panel to rotate from a backrest position to a folded position in which said back panel forms a continuation of said floor over said seat well, said pivotal axes being further disposed to cause said movable floor panel to follow said back panel and articulates with respect thereto between an erect position extending upwardly from the pivotal connection thereof substantially parallel to said back panel and a folded position forming a continuation of said floor over said seat well; and biasing means urging said movable floor panel toward the plane of said floor, said biasing means including tension spring means connected at one end to said movable floor panel at a point remote from the pivotal connection thereof to said back panel, the opposite end of said tension spring means being connected to said floor in said seat well at a point on the opposite side of the pivotal mounting of said back panel from the folded position thereof, said spring means being substantially parallel to said panels in the erect position thereof.

2. In combination with a vehicle having a floor with a recessed portion forming a seat well therein, a folding backrest for a rear seat comprising: a back panel pivotally mounted on said floor in said seat well; a movable floor panel pivotally connected to said back panel on an axis of rotation parallel to the axis of the pivotal mounting of said back panel on said floor; abutment means on said floor adjacent said seat well for supporting said movable floor panel at points remote from the pivotal connection of said movable floor panel, said pivotal axes being disposed to cause said back panel to rotate from a backrest position to a folded position in which said back panel forms a continuation of said floor over said seat well, said pivotal axes being further disposed to cause said movable floor panel to follow said back panel and articulates with respect thereto between an erect position extending upward from the pivotal connection thereof substantially parallel to said back panel and a folded position forming a continuation of said floor over said seat well; and biasing means urging said movable floor panel toward the plane of said floor, said biasing means including tension spring means connected at one end to said movable floor panel at a point remote from the pivotal connection thereof to said back panel, the opposite end of said tension spring means being connected to said floor in said seat well at a point on the opposite side of the pivotal mounting of said back panel from the folded position thereof.

3. In a vehicle structure having a seat bottom and a seat back movable from an upright seat-forming position to a folded floor-forming position, a vehicle floor surface spaced above said seat bottom and having an edge terminating adjacent said seat back in said seat-forming position, linkage means pivotally supporting said seat back for movement from said seat-forming position forwardly and downwardly over said seat bottom to said floor-forming position, said seat back being spaced from said edge in said folded floor-forming position, a floor extension panel pivotally secured to the lower end of said seat back, said floor extension panel being dimensioned to span the distance between said seat back and said edge of said vehicle floor in said folded floor-forming position, roller means secured to said vehicle floor adjacent said edge and extending outwardly therefrom to engage and support said floor extension panel, and means to bias said floor extension panel into constant engagement with said roller means in all positions of said seat back and to positively position said floor extension panel in a floor-forming position between said edge and said seat back when said seat back is in said folded floor-forming position.

4. The structure as defined in claim 3 and having a recess formed on the end of said floor extension panel, said recess being dimensioned to receive said roller means, and said roller means and said recess being spaced and dimensioned to position and retain said floor extension panel closely adjacent and substantially parallel to said vehicle floor in said folded floor-forming position.

References Cited in the file of this patent

UNITED STATES PATENTS 2,926,951    Koplin   ------------------ Mar. 1, 1960

FOREIGN PATENTS 694,578    Germany   --------------- Aug. 3, 1940
928,506    Germany   --------------- June 2, 1955